(12) United States Patent
Govindaraj et al.

(10) Patent No.: US 10,411,512 B2
(45) Date of Patent: Sep. 10, 2019

(54) METHODS AND APPARATUS FOR IMPLEMENTING PRESENCE AND USAGE PATTERN DETECTION IN WIRELESS CHARGING APPLICATIONS

(71) Applicant: QUALCOMM Incorporated, San Diego, CA (US)

(72) Inventors: Arvind Govindaraj, San Diego, CA (US); William Henry Von Novak, III, San Diego, CA (US); Mei-Li Chi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 15/090,920

(22) Filed: Apr. 5, 2016

(65) Prior Publication Data
US 2016/0301252 A1    Oct. 13, 2016

Related U.S. Application Data

(60) Provisional application No. 62/146,064, filed on Apr. 10, 2015.

(51) Int. Cl.
*H02J 50/12*    (2016.01)
*H04B 5/00*    (2006.01)
(Continued)

(52) U.S. Cl.
CPC .............. *H02J 50/12* (2016.02); *H02J 7/025* (2013.01); *H02J 50/60* (2016.02); *H04B 5/0037* (2013.01); *H04B 5/0043* (2013.01); *H02J 50/80* (2016.02)

(58) Field of Classification Search
CPC .. H02J 50/10; H02J 50/12; H02J 50/60; H02J 50/80; H02J 7/02; H02J 7/022;
(Continued)

(56) References Cited

U.S. PATENT DOCUMENTS 8,775,103 B1    7/2014 Jayaraj et al.
2012/0091993 A1    4/2012 Uramoto et al.
(Continued)

OTHER PUBLICATIONS

International Search Report and Written Opinion—PCT/US2016/026243—ISA/EPO—Jun. 10, 2016.

*Primary Examiner* — Lincoln D Donovan
*Assistant Examiner* — Diana J. Cheng
(74) *Attorney, Agent, or Firm* — Polsinelli LLP

(57) ABSTRACT

An apparatus for wirelessly transferring charging power is provided. The apparatus comprises a coupler configured to generate a wireless field when driven with a time-varying current. The apparatus comprises a measurement circuit configured to determine a parasitic capacitance between the coupler and ground while the coupler generates the wireless field. The apparatus comprises a controller circuit configured to determine a presence of a foreign object in response to the determined parasitic capacitance satisfying a detection criteria. The detection criteria may comprises a time-varying pattern of the determined parasitic capacitance predetermined to correspond to presence of a presence of the foreign object. The detection criteria may also comprises a threshold change in the determined parasitic capacitance predetermined to correspond to presence of a presence of the foreign object.

23 Claims, 8 Drawing Sheets

(51) Int. Cl.
*H02J 50/60* (2016.01)
*H02J 7/02* (2016.01)
*H02J 50/80* (2016.01)

(58) Field of Classification Search
CPC ........ H02J 7/025; H02J 7/027; H04B 5/0025; H04B 5/0037; H04B 5/0043; H04B 5/005
USPC .......................................... 307/104; 320/108
See application file for complete search history.

(56) References Cited

U.S. PATENT DOCUMENTS

| | | |
|---|---|---|
| 2013/0015699 A1* | 1/2013 | Mita ....................... H02J 5/005 307/9.1 |
| 2014/0015329 A1 | 1/2014 | Widmer et al. |
| 2014/0049422 A1 | 2/2014 | Von et al. |
| 2014/0183970 A1 | 7/2014 | Kurihara et al. |
| 2015/0022014 A1 | 1/2015 | Tanabe |
| 2015/0084586 A1 | 3/2015 | Von, III et al. |
| 2015/0288214 A1 | 10/2015 | Borngraber |
| 2015/0323694 A1 | 11/2015 | Roy et al. |

\* cited by examiner

METHODS AND APPARATUS FOR IMPLEMENTING PRESENCE AND USAGE PATTERN DETECTION IN WIRELESS CHARGING APPLICATIONS

CLAIM OF PRIORITY UNDER 35 U.S.C. §119

The present Application for Patent claims priority to Provisional Application No. 62/146,064 entitled "METHOD AND APPARATUS FOR IMPLEMENTING PRESENCE AND USAGE PATTERN DETECTION IN WIRELESS CHARGING APPLICATIONS" filed Apr. 10, 2015, and assigned to the assignee hereof. Provisional Application No. 62/146,064 is hereby expressly incorporated by reference herein.

FIELD

This application is generally related to wireless charging power transfer applications, and more specifically to methods and apparatus for implementing presence and usage pattern detection in wireless charging applications.

BACKGROUND

Wireless power transmitters may desire the ability to detect the presence of human beings in order to limit specific absorption rates of electric fields. Thus, it is desirable that such wireless power transmitters implement foreign object detection of living objects such as humans and chargeable device detection. Detection, for example of certain chargeable devices, may also be difficult for chargeable devices that do not create a detectable impedance shift, as measured at the wireless power transmitter coupler terminals, or that are unable to draw significant power from the wireless power transmitter. Accordingly, methods and apparatus for implementing presence and usage pattern detection in wireless charging applications are desirable.

SUMMARY

According to some implementations, an apparatus for wirelessly transferring charging power is provided. The apparatus comprises a coupler configured to generate a wireless field when driven with a time-varying current. The apparatus comprises a measurement circuit configured to determine a parasitic capacitance between the coupler and ground while the coupler generates the wireless field. The apparatus comprises a controller circuit configured to determine a presence of a foreign object in response to the determined parasitic capacitance satisfying a detection criteria.

In some other implementations, a method for wirelessly transferring charging power is provided. The method comprises generating, at a coupler, a wireless field when driven with a time-varying current. The method further comprises determining a parasitic capacitance between the coupler and ground while the coupler generates the wireless field. The method further comprises determining a presence of a foreign object in response to the determined parasitic capacitance satisfying a detection criteria.

In yet other implementations, an apparatus for wirelessly transferring charging power is provided. The apparatus means for generating a wireless field when driven with a time-varying current. The apparatus comprises means for determining a parasitic capacitance between the means for generating and ground while the means for generating generates the wireless field. The apparatus comprises means for determining a presence of a foreign object in response to the determined parasitic capacitance satisfying a detection criteria.

In yet other implementations, a non-transitory, computer-readable medium comprising code that, when, executed, causes an apparatus for wirelessly transferring charging power to generate a wireless field when driven with a time-varying current. The code, when executed, further causes the apparatus to determine a parasitic capacitance between the coupler and ground while the coupler generates the wireless field. The code, when executed, further causes the apparatus to determine a presence of a foreign object in response to the determined parasitic capacitance satisfying a detection criteria.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured, or coupled by a "receive coupler" to achieve power transfer.

The terminology used herein is for the purpose of describing particular implementations only and is not intended to be limiting on the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
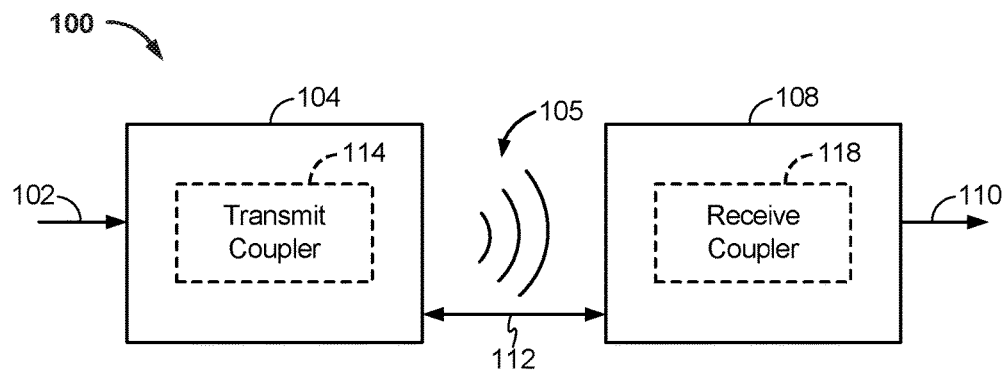
FIG. 1 is a functional block diagram of a wireless power transfer system, in accordance with some implementations.

FIG. 1 is a functional block diagram of a wireless power transfer system 100, in accordance with some implementations. Input power 102 may be provided to a transmitter 104 from a power source (not shown) to generate a wireless (e.g., magnetic or electromagnetic) field 105 via a transmit coupler 114 for performing energy transfer. The receiver 108 may receive power when the receiver 108 is located in the wireless field 105 produced by the transmitter 104. The wireless field 105 corresponds to a region where energy output by the transmitter 104 may be captured by the receiver 108. A receiver 108 may couple to the wireless field 105 and generate output power 110 for storing or consumption by a device (not shown in this figure) coupled to the output power 110. Both the transmitter 104 and the receiver 108 are separated by a distance 112.

In one example implementation, power is transferred inductively via a time-varying magnetic field generated by the transmit coupler 114. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be reduced. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space. Resonant inductive coupling techniques may thus allow for improved efficiency and power transfer over various distances and with a variety of inductive coupler configurations.

In some implementations, the wireless field 105 corresponds to the "near-field" of the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114. Efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118.

Figure 2:
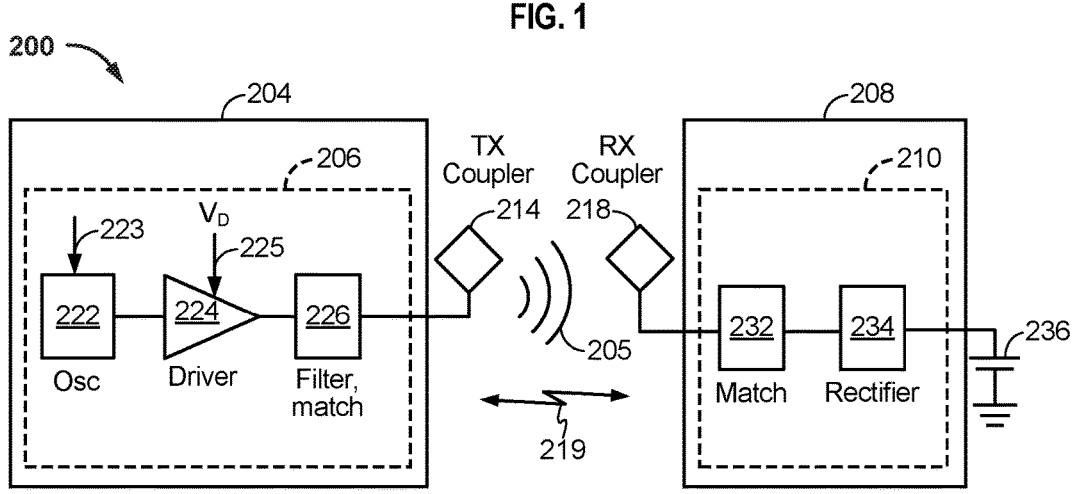
FIG. 2 is a functional block diagram of a wireless power transfer system, in accordance with some other implementations.

FIG. 2 is a functional block diagram of a wireless power transfer system 200, in accordance with some other implementations. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that may be adjusted in response to a frequency control signal 223. The oscillator 222 provides the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 filters out harmonics or other unwanted frequencies and matches the impedance of the transmit circuitry 206 to the transmit coupler 214. As a result of driving the transmit coupler 214, the transmit coupler 214 generates a wireless field 205 to wirelessly output power at a level sufficient for charging a battery 236.

The receiver 208 comprises receive circuitry 210 that includes a matching circuit 232 and a rectifier circuit 234. The matching circuit 232 may match the impedance of the receive circuitry 210 to the impedance of the receive coupler 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
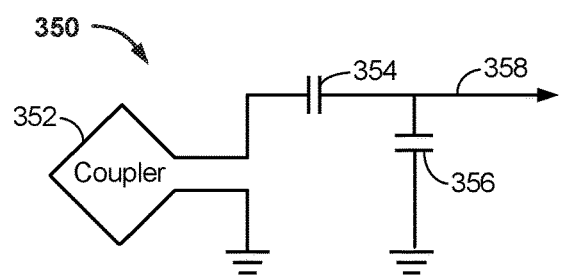
FIG. 3 is a schematic diagram of a portion of transmit circuitry or receive circuitry of FIG. 2 including a transmit or receive coupler, in accordance with some implementations.

FIG. 3 is a schematic diagram of a portion of the transmit circuitry 206 or the receive circuitry 210 of FIG. 2, in accordance with some implementations. As illustrated in FIG. 3, transmit or receive circuitry 350 may include a coupler 352. The coupler 352 may also be referred to or be configured as a "conductor loop", a coil, an inductor, or a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added via a capacitor (or the self-capacitance of the coupler 352) to create a resonant structure at a desired resonant frequency. As a non-limiting example, a capacitor 354 and a capacitor 356 may be added to the transmit or receive circuitry 350 to create a resonant circuit at a resonant frequency. For larger sized couplers using large diameter couplers exhibiting larger inductance, the value of capacitance needed to produce resonance may be lower. Furthermore, as the size of the coupler increases, coupling efficiency may increase. This is mainly true if the size of both transmit and receive couplers increase. For transmit couplers, the signal 358, oscillating at a frequency that substantially corresponds to the resonant frequency of the coupler 352, may be an input to the coupler 352. For receive couplers, the signal 358 may be output to power or charge a load.

In some implementations, in order to accurately detect the present of a living or foreign object (e.g., a human being, another living animal, a non-metallic object, or other non-charging object for which charging is not intended), and/or the presence of a chargeable device (in some instances considered a foreign object) in the vicinity of the wireless power transmitter, a wireless power transmitter may include a measurement circuit and possibly one or more sense pads located at a disparate location from the wireless power transmitter (e.g., coupler) for determining such presences. In addition, where a chargeable device does not draw enough power for the wireless power transmitter to detect, the chargeable device may further include a communications circuit for notifying the wireless power transmitter of its presence. Such implementations will be described in more detail in connection with FIGS. 4-8 below.

Figure 4:
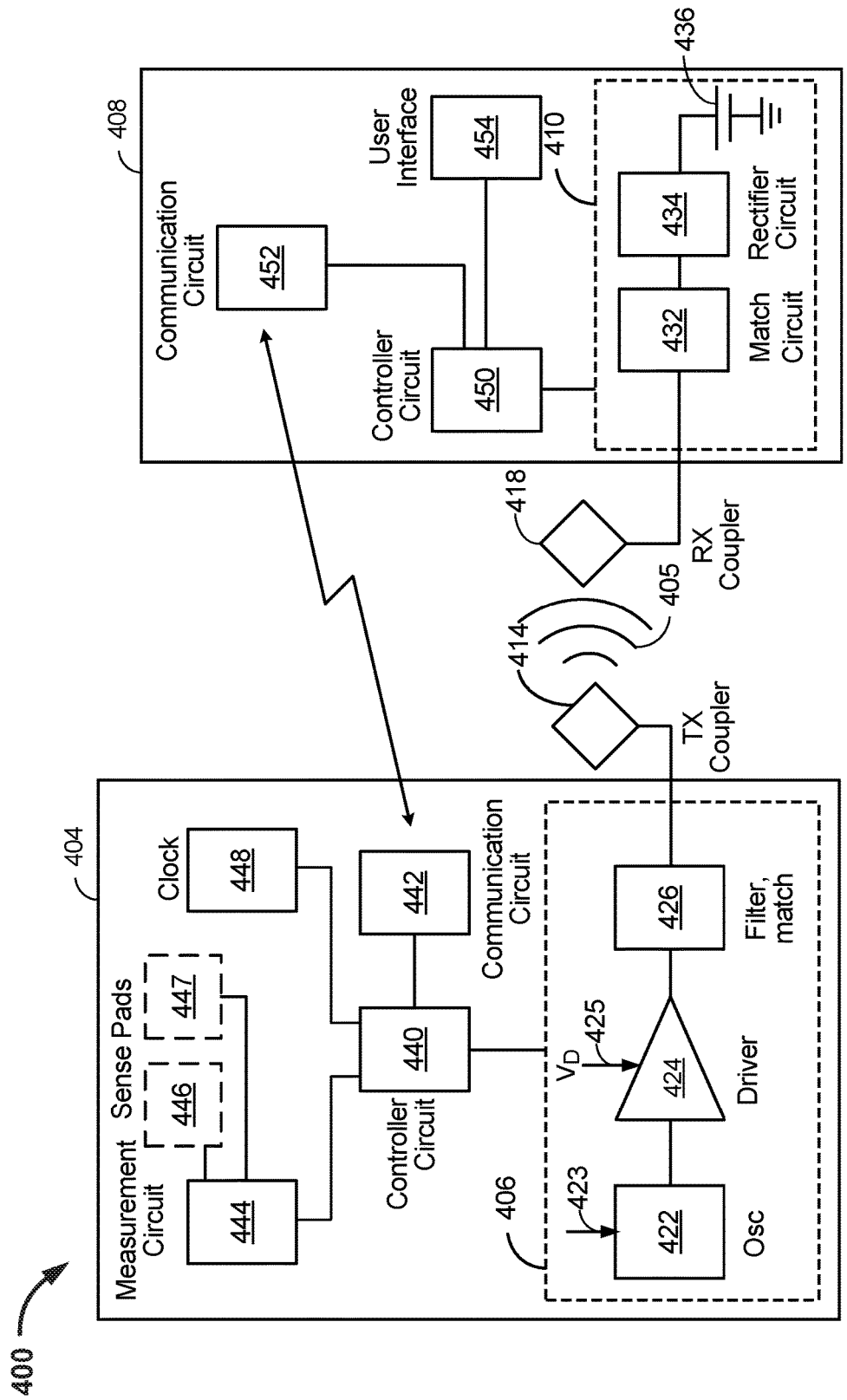
FIG. 4 is a more detailed functional block diagram of a wireless power transfer system similar to that discussed in connection with any of FIGS. 1-3, in accordance with some implementations.

FIG. 4 is a more detailed functional block diagram of a wireless power transfer system 400 similar to that discussed in connection with FIGS. 1-3, in accordance with some implementations. FIG. 4 describes the interaction between a wireless power transmitter 404 and a chargeable device 408 (i.e., receiver). The transmitter 404 includes transmit circuitry 406 that includes an oscillator 422 controlled by a signal 423, a driver circuit 424 controlled by a signal 425 having a variable voltage $V_D$, and a filter and matching circuit 426. The transmit circuitry 406 and all included components may have similar functions to the corresponding transmit circuitry 206 and previously described, similarly numbered components included therein unless otherwise stated. The output of the transmit circuitry 406 may be provided to a transmit coupler 414 (e.g., corresponding to the transmit coupler 214 of FIG. 2). The transmitter 404 may additionally include a controller circuit 440 configured to control at least the transmit circuitry 406 and possibly configured to receive measurement data from a measurement circuit 444 and a reference signal from a clock 448. The transmitter 404 further includes a communication circuit 442 configured for communication between the transmitter 404 and the chargeable device 408, as will be described in more detail below. The measurement circuit 444 is configured to measure at least one attribute of the transmitter 404 (e.g., a resonance frequency of the transmit circuitry 406 when loaded by the transmit coupler 414, a capacitance or impedance between a portion of the coupler 414 and either a local ground or earth ground, a capacitance or impedance of one or more sense pads 446, 447, or an equivalent impedance of either the transmit coupler 414 or of the one or more sense pads 446, 447). The clock 448 is configured to provide a reference timing signal that may be utilized by the measurement circuit 444 and/or the controller circuit 440 for determining, sensing or detecting one or more of the above-mentioned attributes of the transmitter 404 at one or more different time instants or during one or more different time intervals.

In operation, the transmit circuitry 406 may provide an oscillating or time-varying drive signal to the transmit coupler 414 such that an oscillating or time-varying current circulating through the transmit coupler 414 generates a wireless field 405 having both an electric field component and a magnetic field component. Charging power is wirelessly transmitted inductively (e.g., wirelessly) via the magnetic field component. A receive coupler 418 of the chargeable device 408 may be configured to generate an oscillating or time-varying drive signal under the influence of the wireless field 405.

The chargeable device 408 may comprise the receive coupler 418 electrically connected to a receive circuitry 410, which may correspond to the receive coupler 218 and the receive circuitry 210 of FIG. 2, respectively. The receive circuitry 410 may include a match circuit 432 electrically connected to a rectifier circuit 434. The receive coupler 418 may be electrically connected to the match circuit 432. The rectifier circuit 434 may provide a DC current to a battery 436. Unless stated otherwise, each component within the receive circuitry 410 may correspond to and have substantially the same functionality as the respective component within the receive circuitry 210, as previously described in connection with FIG. 2.

The chargeable device 408 may further include a controller circuit 450 electrically connected to each of a communication circuit 452, a user interface 454, and the receive circuitry 410. The controller circuit 450 may control the receive circuitry 410, the communication circuit 452, and the user interface 454. The communication circuit 452 may provide a communications link to the transmitter 404. The user interface 454 may be configured to provide feedback to a user of the chargeable device 408.

Figure 5:
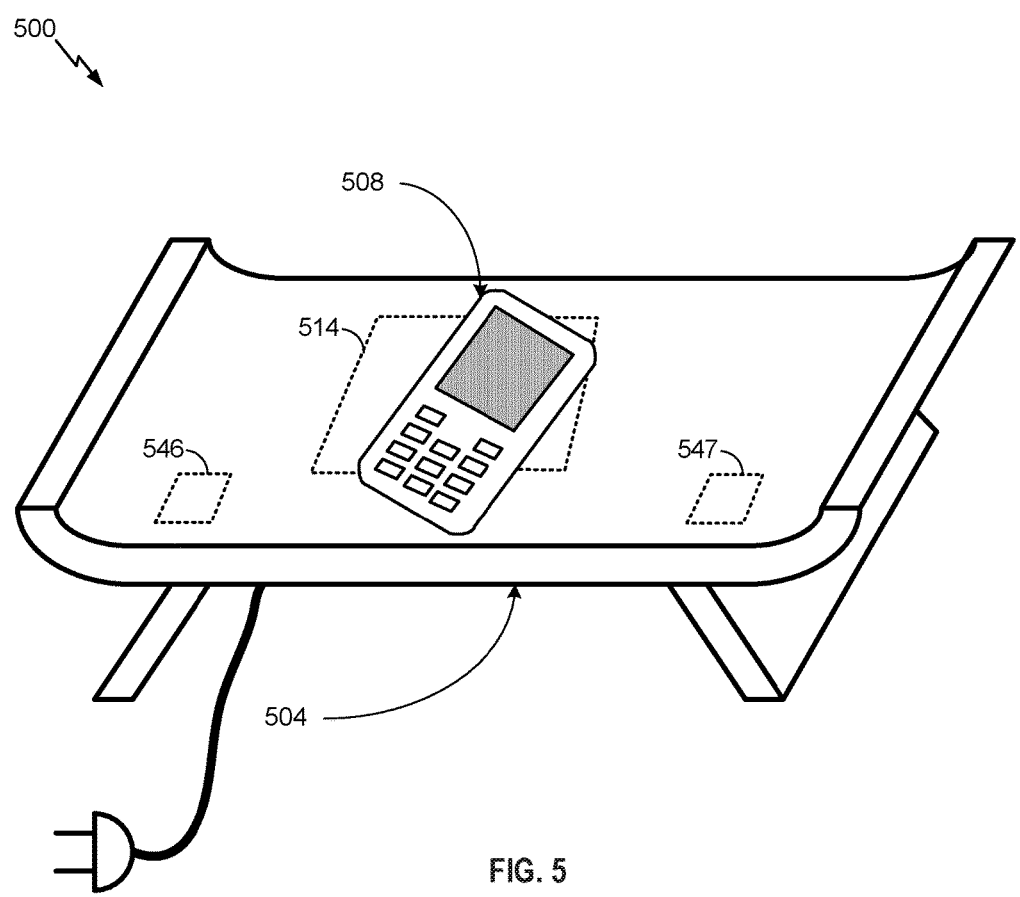
FIG. 5 is an illustration of a wireless power transfer system similar to that previously described in connection with FIG. 4.

FIG. 5 is an illustration of a wireless power transfer system 500 similar to that previously described in connection with FIG. 4. The wireless power transfer system 500 may include a wireless power transmitter 504 and a chargeable device 508, which may be placed on a surface of the wireless power transmitter 504, corresponding to respective transmitter 404 and chargeable device 408 of FIG. 4. The wireless power transmitter 504 may include a transmit coupler 514, shown in dotted line to indicate possible internal mounting and corresponding to transmit coupler 414 of FIG. 4, as well as a plurality of sense pads 546, 547, similarly shown in dotted line and corresponding to sense pads 446, 447 of FIG. 4. Although two sense pads 546, 547 are shown, implementations having one or more sense pads are contemplated with respect to FIG. 5. Moreover, the shapes, dimensions and locations of the sense pads 546, 547 may be varied. For example, the sense pads 546, 547 may alternatively be located directly over the transmit coupler 514, since the sense pads 546, 547 are not expected to influence the magnetic field generated by the transmit coupler 514. As will be described in more detail in connection with at least FIG. 8, the sense pads 546, 547 may be utilized to detect, determine or sense movements of the chargeable device 508 or a living object (e.g., a human being or animal) in the vicinity of the wireless power transmitter 504 for subsequent control or otherwise adjustment of a wireless field (not shown) generated by the transmit coupler 514 (which can generally referred to as adjustment of an operational parameter).

Figure 6:
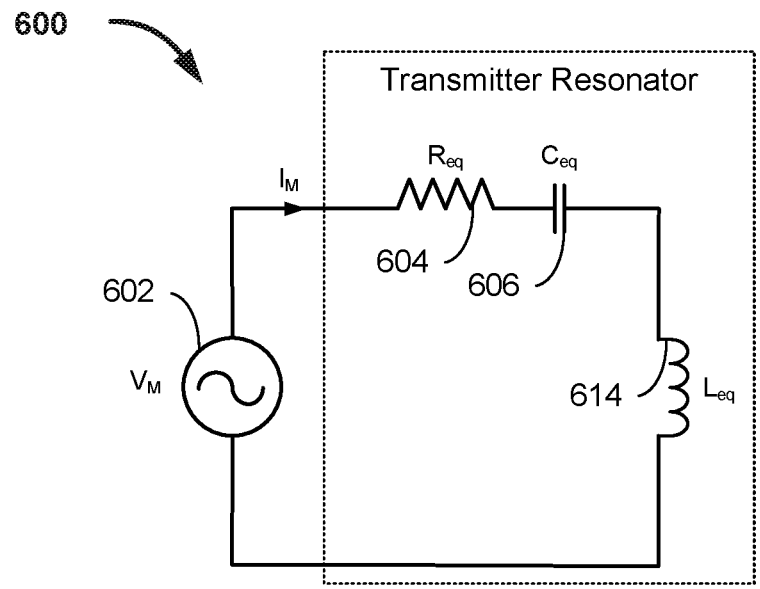
FIG. 6 is a schematic diagram of an equivalent circuit for a wireless power transmitter coupler configured as a resonator or resonant circuit, as previously described in connection with any of FIGS. 1-5.

FIG. 6 is a schematic diagram of an equivalent circuit 600 for a wireless power transmitter coupler configured as a resonator or resonant circuit, as previously described in connection with any of FIGS. 1-5. The equivalent circuit 600 of FIG. 6 represents a transmitter (e.g., the transmitter 404) with an empty pad (e.g., no chargeable device or living object in the vicinity of the transmit coupler 414). The equivalent circuit 600 comprises a voltage source 602 providing an alternating or time-varying driving voltage $V_M$ that drives an alternating or time-varying current $I_M$. The magnitude of the current $I_M$, and its phase with respect to the driving voltage $V_M$, are dependent upon the complex impedance presented by the transmitter resonator. The transmitter resonator is shown as a series connection of a resistor 604 having resistance $R_{eq}$, a capacitor 606 having capacitance $C_{eq}$, and an inductor 614 having inductance $L_{eq}$ within the dotted lined box. The equivalent resistance $R_{eq}$, capacitance $C_{eq}$, and inductance $L_{eq}$ represent all resistances, capacitances, and inductances, respectively, in the path of the transmitter resonator. The self-inductance $L_{eq}$ of the inductor 614 dominates at lower frequencies, while at higher frequencies the inter-winding capacitance included in $C_{eq}$ begins to dominate. A principle by which implementations described below operate is that human beings, other living creatures, and even a chargeable device have a relatively higher electrical permittivity as compared to air and so the presence of any in the vicinity of the inductor 614 provides additional paths for electric field coupling. This has the effect of increasing the capacitance $C_{eq}$, and adjusting the impedance and the power transmission frequency of the equivalent circuit 600, which may be measured or detected via a grid dip oscillator, for example.

Thus, a first method for determining a presence of an object having a relatively higher electrical permittivity than air may include measuring the equivalent capacitance $C_{eq}$ (or total impedance) of the inductor 614 (e.g., coupler) at a frequency that is higher than the power transmission frequency (e.g., a higher order harmonic of the power transmission frequency). In some implementations, the equivalent capacitance $C_{eq}$ (or total impedance) of the inductor 614 (e.g., coupler) may be measured at a frequency that is lower than the power transmission frequency. If the equivalent capacitance $C_{eq}$ (or total resonator impedance) is measured to have a value greater than a predetermined threshold (e.g., by the measurement circuit 444 of FIG. 4), the presence of that object may be positively determined (e.g., by the controller circuit 440 of FIG. 4), and the power output of the resonator (e.g., of the transmit coupler 414 of FIG. 4) may be adjusted or turned off (e.g., by the controller circuit 440 of FIG. 4). Such measurements of the capacitance $C_{eq}$ (or the total impedance of the coupler) may be made or determined while the coupler 414 is being driven at or substantially near its power transmission frequency, where the driving signal provided by the driver circuit 424 includes sufficiently strong higher order harmonics of that power transmission frequency. In the alternative, such measurements of the capacitance $C_{eq}$ (or the total impedance of the coupler) may be made or determined while the coupler 414 is being driven directly at a higher order harmonic frequency of or any frequency substantially higher than the power transmission frequency of the coupler 414, either by the driver circuit 424, or by another power source (not shown in FIG. 4). In such an alternative, the coupler 414 may be non-operational in that it is not being driven with a driving signal at the power transmission frequency of the coupler 414 and/or for the purpose of wireless power transmission.

Figure 7:
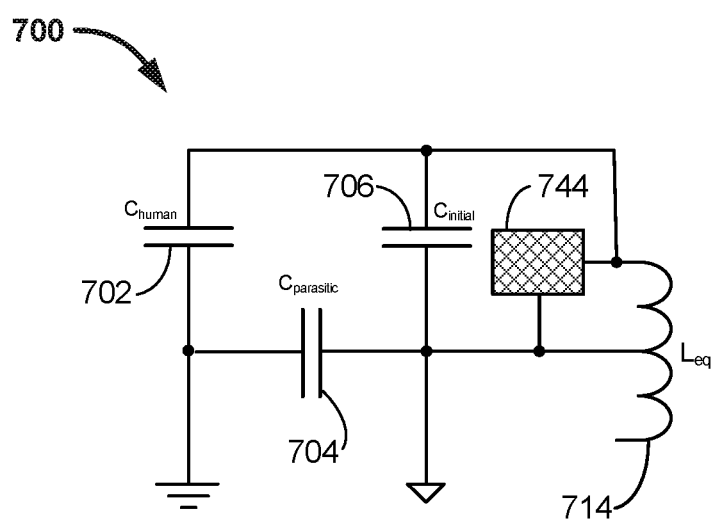
FIG. 7 is a schematic diagram of an equivalent circuit for at least a portion of a wireless power transmitter similar to that of FIG. 4 including a measurement circuit, in accordance with some implementations.

FIG. 7 is a schematic diagram of an equivalent circuit 700 for at least a portion of a wireless power transmitter similar to that of FIG. 4 including a measurement circuit 744, in accordance with some implementations. The equivalent circuit 700 includes an inductor 714, which may correspond to the inductor or couplers 414/614 of FIGS. 4/6. Capacitors 702, 704, and 706 represent capacitances provided by different sources that. In some implementations, the inductor 714, which may represent the power transmit resonator, may be differentially driven, in which case a center of the inductor 714 (e.g., a node at a midpoint of a coil forming the coupler) may be connected to local ground. In such a case, a capacitor 704 having capacitance $C_{parasitic}$ represents a parasitic capacitance between the local ground and earth ground. Where the center of the inductor 714 is connected directly to earth ground, the capacitor 704 would not be present and the nodes at either terminal of the capacitor 704 would merge into the same node. The capacitor 706 may have a capacitance of $C_{initial}$ and may represent an initial capacitance of the equivalent circuit 700 when no chargeable device or living object is located in the vicinity of the inductor 714. When a living object (e.g., a human begin or an appendage thereof having a higher permittivity than air) is moved into the vicinity of the inductor 714, the capacitance of the inductor 714 will increase. This increase is represented by the capacitor 702 having a capacitance $C_{human}$. This change in capacitance will cause a change in total capacitance, which may be detected by the measuring circuit 744 (e.g., corresponding to the measuring circuit 444 of FIG. 4).

Thus, a second method for determining a presence of an object having a relatively higher electrical permittivity than air may include measuring a capacitance between a point on the coupler (e.g., a point on the inductive coil) and ground (e.g., either earth ground or local ground). If the total capacitance is measured to have a value greater than a predetermined threshold (e.g., by the measurement circuit 444 of FIG. 4), the presence of that object may be positively determined (e.g., by the controller circuit 440 of FIG. 4), and the power output of the resonator (e.g., of the transmit coupler 414 of FIG. 4) may be adjusted or turned off (e.g., by the controller circuit 440 of FIG. 4). In some implementations, placing a device for charge will result in a unique set of motions of the hand placing the device on the wireless power transmitter, which may be detected with a suitable algorithm that processes the measurements of the parasitic capacitance $C_{human}$ between the inductor 714 and ground over time (e.g., at a plurality of time instants). For example, the act of placing an object on the wireless power transmitter can have a specific capacitance change with respect to the sensing pad and time (e.g., a gradual hand movement from the edge to the center of the pad) followed by a Bluetooth connection request. These actions are typically separated by hundreds of milliseconds and hence are unlikely to be corrupted by other actions (leading to a false positive detection). Accordingly, one example detection algorithm can monitor capacitance, trigger on a specific capacitance change, wait for a Bluetooth connection request, and positively determine the object upon receipt of the Bluetooth connection request within a certain time interval (which in some examples can be on the order of hundreds of milliseconds).

Figure 8:
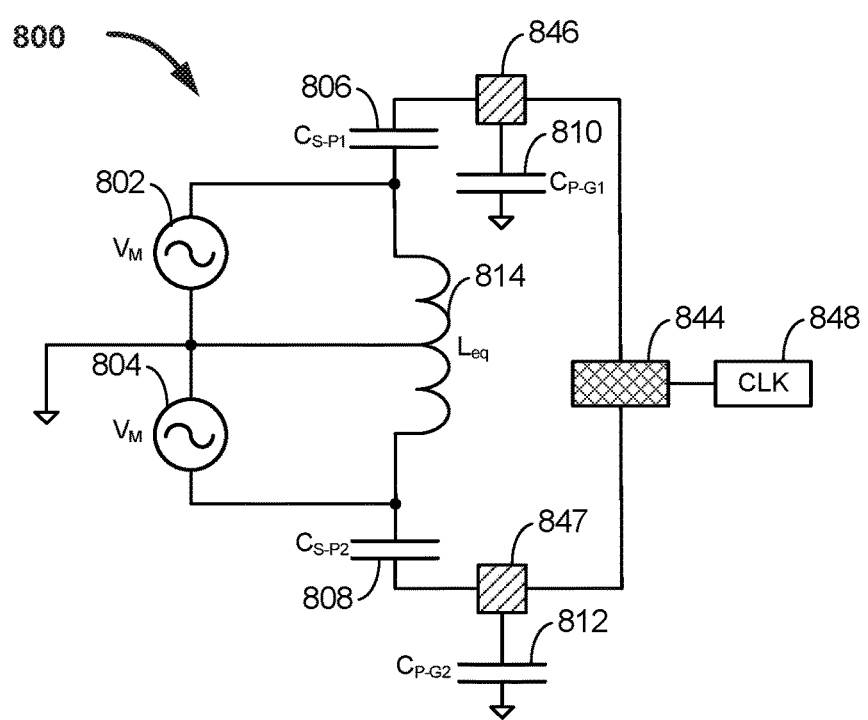
FIG. 8 is a schematic diagram of an equivalent circuit for at least a portion of a wireless power transmitter similar to that of FIG. 4 including a measurement circuit and a plurality of sense pads, in accordance with some implementations.

FIG. 8 is a schematic diagram of an equivalent circuit 800 for at least a portion of a wireless power transmitter similar to that of FIG. 4 including a measurement circuit 844 and a plurality of sense pads 846, 847, in accordance with some implementations. The equivalent circuit 800 includes a first voltage source 802 connected in series with a second voltage source 804 at a local ground node. Each voltage source provides an alternating or time-varying driving voltage $V_M$, though 180° out of phase with one another. The series connection of the first voltage source 802 and the second voltage source 804 are connected across a coupler 814 (e.g., an inductive coil, corresponding to the coupler 414 of FIG. 4). A center point of the coupler 814 is connected to the local ground node. Thus, in such implementations, the coupler 814 is differentially driven by the series combination of the first voltage source 802 and the second voltage source 804.

The equivalent circuit 800 additionally includes a first sense pad 846 (corresponding to the sense pads 446, 546 of FIGS. 4, 5) and a second sense pad 847 (corresponding to the sense pads 447, 547 of FIGS. 4, 5). These sense pads 846, 847 may be parasitically capacitively coupled to both the local ground and to the coupler 814. For example the first sense pad 846 is shown as capacitively coupled to local ground via a pad-to-ground capacitance $C_{P-G1}$ symbolized by a capacitor 810, and to the coupler 814 via a source-to-pad capacitance $C_{S-P1}$ symbolized by a capacitor 806. Likewise, the second sense pad 847 is shown as capacitively coupled to local ground via a pad-to-ground capacitance $C_{P-G2}$ symbolized by a capacitor 812, and to the coupler 814 via a source-to-pad capacitance $C_{S-P2}$ symbolized by a capacitor 808. Thus, the combination of the capacitors 806 and 810 form a first capacitive voltage divider, where a voltage induced in the sense pad 846 by an electric field generated by the coupler 814 is dependent upon the relationship between the parasitic capacitance $C_{S-P1}$ of the capacitor 806 and the parasitic capacitance $C_{P-G1}$ of the capacitor 810. Similarly, the combination of the capacitors 808 and 812 form a second capacitive voltage divider, where a voltage induced in the sense pad 847 by an electric field generated by the coupler 814 is dependent upon the relationship between the capacitance $C_{S-P2}$ of the capacitor 808 and the capacitance $C_{P-G2}$ of the capacitor 812. As previously described, because a living object (e.g., a human being or animal) has a higher electric permittivity than does air, when such an object is brought into the vicinity of the coupler 814 and/or the sense pads 846, 847, it increases one or more of the capacitances $C_{S-P1}$, $C_{S-P2}$ and $C_{P-G1}$, $C_{P-G2}$. This causes a change in the voltage induced at the sense pads 846, 847 by the electric field of the coupler 814. This change in the induced voltage at the sense pads 846, 847 and can be utilized to make a positive determination of the presence of such living objects. In addition, the phase of the induced voltage at the sense pads 846, 847 may also shift with respect to a reference waveform (e.g., a clock waveform) due to new electric coupling paths created by a living object in the vicinity of the sense pads 846, 847 as well as portions of the power transmission resonator. This phase shift may also be utilized to make a positive determination of the presence of such living objects. For example, a measurement circuit 844 (corresponding to the measurement circuit 444 of FIG. 4) may be configured to measure the induced voltages in each of the sense pads 846, 847. Where phase shift is measured, or where multiple voltage or phase shift measurements are taken over time, a clock 848 (corresponding to the clock 448 of FIG. 4) may provide a reference signal. In some implementations, placing a device for charge will result in a unique set of motions of the hand placing the device on the wireless power transmitter, which may be detected with a suitable algorithm that processes the measurements of one or both of $C_{S-P1}$ and $C_{P-G1}$ and/or one or both $C_{S-P2}$ and $C_{P-G2}$ over time (e.g., at a plurality of time instants).

Thus, a third method for determining a presence of an object having a relatively higher electrical permittivity than air may include measuring one or both of an amplitude and a phase shift of a voltage induced in at least one sense pad by an externally generated electric field, for example, generated by the wireless power transmitter during wireless power transmission. If an amplitude of the voltage exceeds or contrarily falls below a predetermined threshold, the presence of a living object may be positively determined by a controller circuit (e.g., the controller circuit 440 of FIG. 4). Likewise, where the phase shift of the voltage is measured with respect to some reference signal, if the phase shift exceeds a predetermined threshold, the presence of a living object may be positively determined by a controller circuit (e.g., the controller circuit 440 of FIG. 4). Upon such a positive determination the power output of the resonator (e.g., of the transmit coupler 414 of FIG. 4) may be adjusted or turned off (e.g., by the controller circuit 440 of FIG. 4). It should be noted that the voltage across the coupler 814 and hence the electric fields radiated by the coupler 814 vary as a function of time as well as the operating condition of the transmitter, which should be taken into consideration when determining the above-mentioned voltage amplitude and/or phase shift thresholds.

In some implementations, the measurement of a change in the amplitude of the voltage induced in just one of the sense pads 846, 847 may not be robust enough to accurately and reliably provide positive detection of a living object. However, when these changes in either the amplitude or phase shift of the voltage are correlated with measurements made at each of a plurality of sense pads (e.g., the sense pads 846, 847) such positive determinations may become more robust and accurate. Thus, a fourth method for determining a presence of an object having a relatively higher electrical permittivity than air may include measuring one or both of an amplitude and a phase shift of a voltage induced in each of a plurality of sense pads by an externally generated electric field. The absolute magnitude or relative changes in the amplitudes and/or phase shifts of the voltages may be correlated with one another. If the correlation between the measured changes for each or at least a subset of the plurality of sense pads exceeds a predetermined value (or satisfies some other predetermined relationship), the presence of a living object may be positively determined by a controller circuit (e.g., the controller circuit 440 of FIG. 4). Upon such a positive determination the power output of the resonator (e.g., of the transmit coupler 414 of FIG. 4) may be adjusted or turned off (e.g., by the controller circuit 440 of FIG. 4).

In a fifth method for determining a presence of an object having a relatively higher electrical permittivity than air may include measuring one or both of an amplitude and a phase shift of a voltage induced in each of a plurality of sense pads by an externally generated electric field at each of a plurality of time instants. The absolute magnitude or relative changes in the amplitudes and/or phase shifts of the voltages for each of the sense pads and at each of the plurality of time instants may be correlated with one another. If the correlation between the measured changes for each or at least a subset of the plurality of sense pads exceeds a predetermined value (or satisfies some other predetermined relationship), the presence of a living object may be positively determined by a controller circuit (e.g., the controller circuit 440 of FIG. 4). Upon such a positive determination the power output of the resonator (e.g., of the transmit coupler 414 of FIG. 4) may be adjusted or turned off (e.g., by the controller circuit 440 of FIG. 4). Thus, the fourth method includes the added dimension of measurements separated in time (the measurements at the plurality of time instants) along with measurements separated in space (the measurements taken at each of the sense pads).

In some implementations, a chargeable device may not cause impedance shifts detectable at the transmit coupler itself, nor draw enough power at boot up or during operation to be reliably detected based on changes in current draw at the transmit coupler. In such implementations, determination of the presence of a living object (e.g., a hand or arm of a human being placing the chargeable device on the transmitter) may be utilized in conjunction with a feedback signal from the chargeable device once booted up in order to determine the presence of the chargeable device for charging. Such a signal may be transmitted by the communication circuit 452 under the control of the controller circuit 450 in the chargeable device 408 of FIG. 4. The communication circuit 442 of the transmitter 404 may be configured to receive this message, forward the received message or an indication of reception of that message to the controller circuit 440, which may control some aspect of charging including but not limited to maintaining charging power for a period of time after receipt of the message (e.g., 1 s, 3 s, 30 s to ensure transmission of enough power for a long enough duration for the chargeable device to boot up), reducing the power output of the transmitter 404 for a period of time, or discontinuing the power output altogether.

Figure 9:
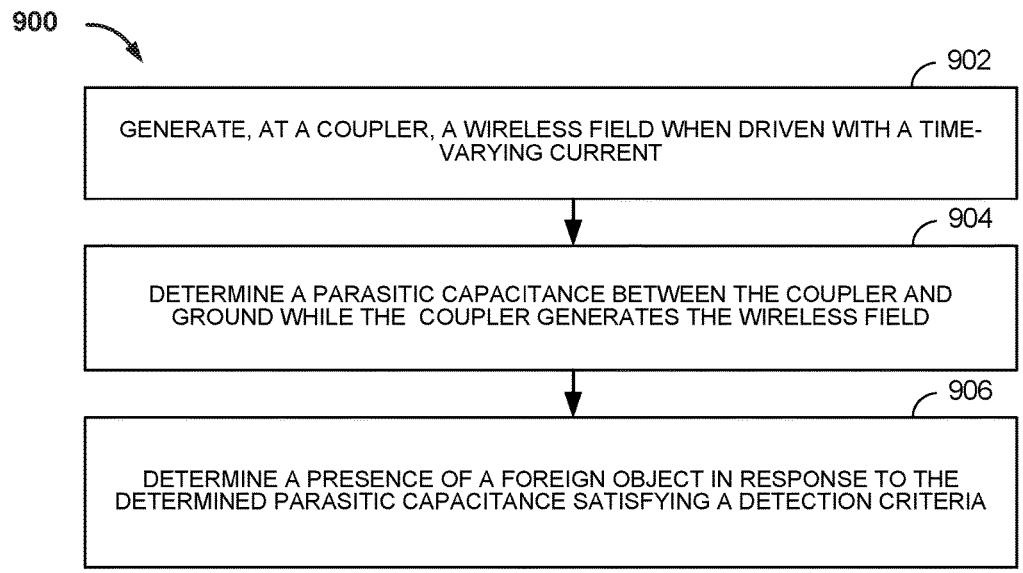
FIG. 9 is a flowchart depicting a method for wireless power transfer, in accordance with some implementations.

FIG. 9 is a flowchart 900 depicting a method for wireless power transfer, in accordance with some implementations. The flowchart 900 is described herein with reference to FIGS. 4-7. In an implementation, one or more of the blocks in flowchart 900 may be performed by a wireless power transmitter, such as the transmitter 404 as shown in FIG. 4. Although the flowchart 900 is described herein with reference to a particular order, in various implementations, blocks herein may be performed in a different order, or omitted, and additional blocks may be added.

Block 902 includes generating a wireless field when driven with a time-varying current. For example, as previously described in connection with FIG. 4, the driver circuit 424 may drive the coupler 414 with a time-varying current to generate the wireless field 405.

Block 904 includes determining a parasitic capacitance between the coupler and ground while the coupler generates the wireless field. For example, as previously described in connection with FIGS. 4, 6 and 7, the measurement circuit 444/744 may determine the parasitic capacitance $C_{human}$ between the coupler 414 and a local ground or earth ground connection.

Block 906 includes determining a presence of a foreign object in response to the determined parasitic capacitance satisfying a detection criteria. For example, as previously described in connection with FIGS. 4, 6 and 7, the controller circuit 440 may compare the determining a presence of a foreign object in response to the determined parasitic capacitance $C_{human}$ satisfying a time-varying pattern of the determined parasitic capacitance predetermined to correspond to presence of a presence of the foreign object. For example, the act of placing an object on the wireless power transmitter can have a specific capacitance change with respect to the sensing pad and time (e.g., a gradual hand movement from the edge to the center of the pad) followed by a Bluetooth connection request. These actions are typically separated by hundreds of milliseconds, which can constitute one example of a time-varying pattern. Accordingly, one example of an algorithm that can detect such a time-varying pattern can monitor capacitance, trigger on a specific capacitance change, wait for a Bluetooth connection request, and positively determine the object upon receipt of the Bluetooth connection request within a certain time interval (which in some examples can be on the order of hundreds of milliseconds). Another example of a time-varying pattern can include throttling of fields in the presence of static humans or animals. For example, typical human actions are very slow with respect to time (e.g., on the order of hundreds of milliseconds to seconds) and the continuous presence of a human or animal can be detected by monitoring the capacitance variation with respect to time across sense pad(s). If the algorithm detects a slow rate of change of capacitance with respect to the sense pad and time (e.g., via analysis of data stored in a suitable matrix structure), it can conclude the presence of a static human or animal and throttle the fields.

Figure 10:
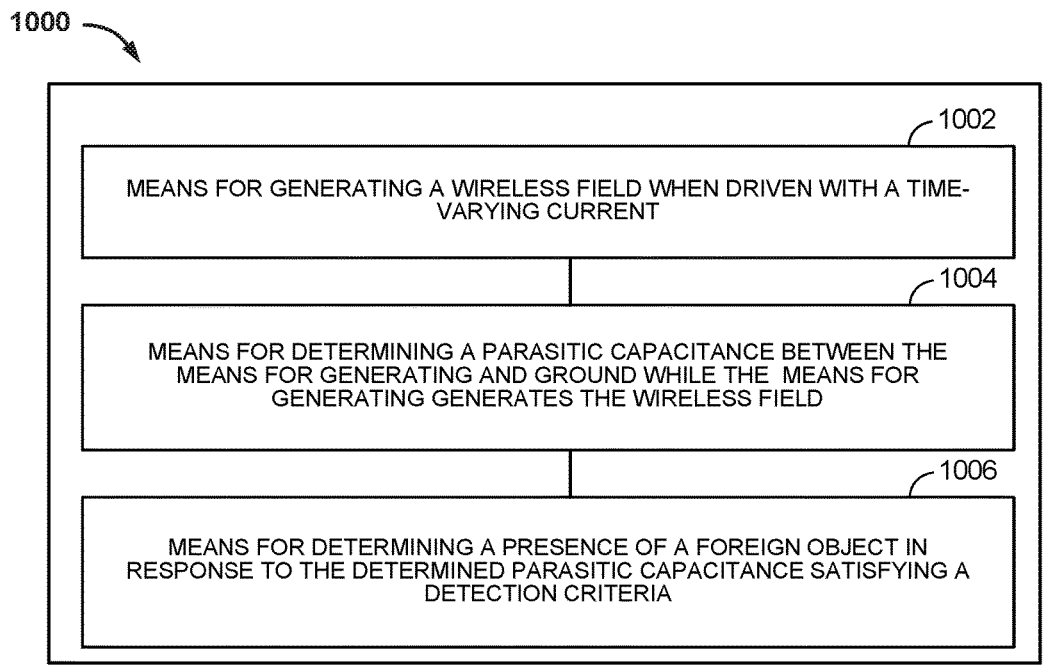
FIG. 10 is a functional block diagram of an apparatus for wireless power transfer, in accordance with some implementations.

FIG. 10 is a functional block diagram of an apparatus 1000 for wireless power transfer, in accordance with some implementations. The apparatus 1000 may be configured to perform one or more operations as previously described in connection with FIG. 9. The apparatus 1000 includes means 1002 for generating a wireless field when driven with a time-varying current. In some implementations, the means 1002 may comprise the coupler 414 of FIG. 4.

The apparatus 1000 further includes means 1004 for determining a parasitic capacitance between the coupler and ground while the coupler generates the wireless field. In some implementations, the means 1004 may be configured to perform the operation of operation block 904 previously described in connection with FIG. 9. In some implementations, means 1004 may comprise the measurement circuit 444 of FIG. 4.

The apparatus 1000 further includes means 1006 for determining a presence of a foreign object in response to the determined parasitic capacitance satisfying a detection criteria. In some implementations, the means 1006 may be configured to perform the operation of operation block 906 previously described in connection with FIG. 9. In some implementations, means 1006 may comprise the controller circuit 440, as previously described in connection with FIG. 4.

Figure 11:
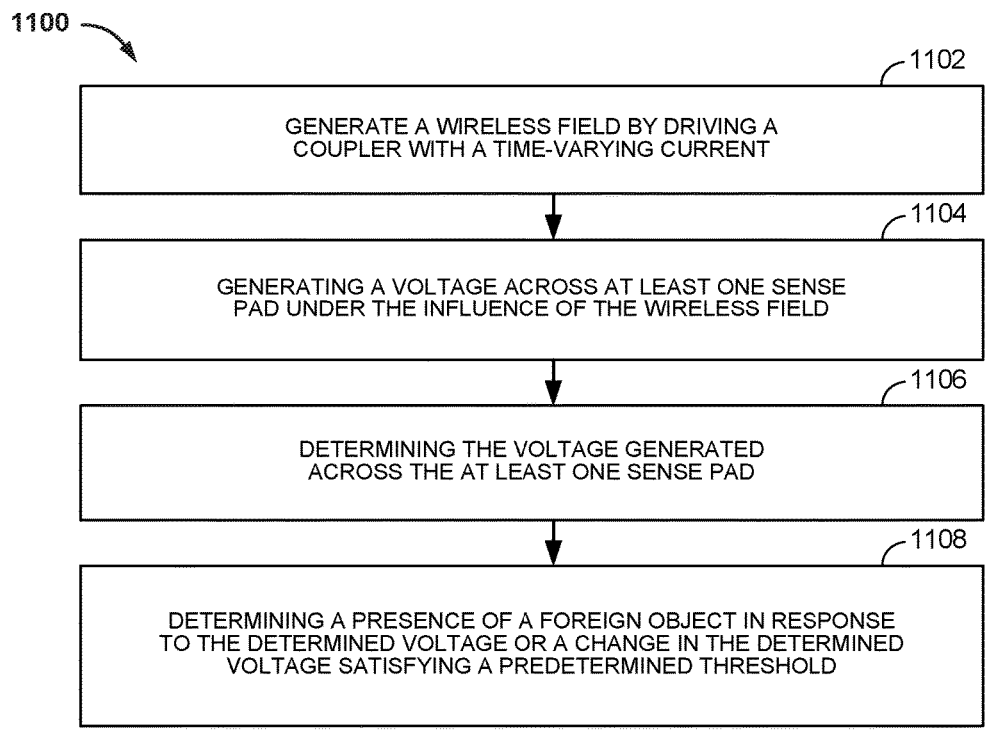
FIG. 11 is a flowchart depicting another method for wireless power transfer, in accordance with some implementations.

FIG. 11 is a flowchart 1100 depicting another method for wireless power transfer, in accordance with some implementations. The flowchart 1100 is described herein with reference to FIGS. 4-8. In an implementation, one or more of the blocks in flowchart 1100 may be performed by a wireless power transmitter, such as the transmitter 404 as shown in FIG. 4. Although the flowchart 1100 is described herein with reference to a particular order, in various implementations, blocks herein may be performed in a different order, or omitted, and additional blocks may be added.

Block 1102 includes generating a wireless field by driving a coupler with a time-varying current. For example, as previously described in connection with FIG. 4, the driver circuit 424 may drive the coupler 414 with a time-varying current to generate the wireless field 405.

Block 1104 includes generating a voltage across at least one sense pad under the influence of the wireless field. For example, as previously described in connection with FIGS. 4, 5 and 8, sense pads 446, 447, 546, 547, 846, 847 may generate (or have induced) a voltage across their terminals under the influence of the wireless field 405.

Block 1106 includes determining the voltage generated across the at least one sense pad. For example, as previously described in connection with FIGS. 4, 5 and 8, the measurement circuit 444 may measure or determine the voltage generated across the terminals of the sense pads 446, 447.

Block 1108 includes determining a presence of a foreign object in response to the determined voltage or a change in the determined voltage satisfying a predetermined threshold. For example, as previously described in connection with FIGS. 4, 5 and 8, the controller circuit 440 may compare the determined voltage induced across the terminals of the sense pads 446, 447 with some predetermined threshold value indicative of, e.g., a human being in the vicinity of the transmitter 404. If the above-mentioned determined voltage or change in that determined voltage exceeds the predetermined threshold, the controller circuit 440 may make a positive determination as to the presence of, e.g., a human being in the vicinity of the transmitter 404.

Figure 12:
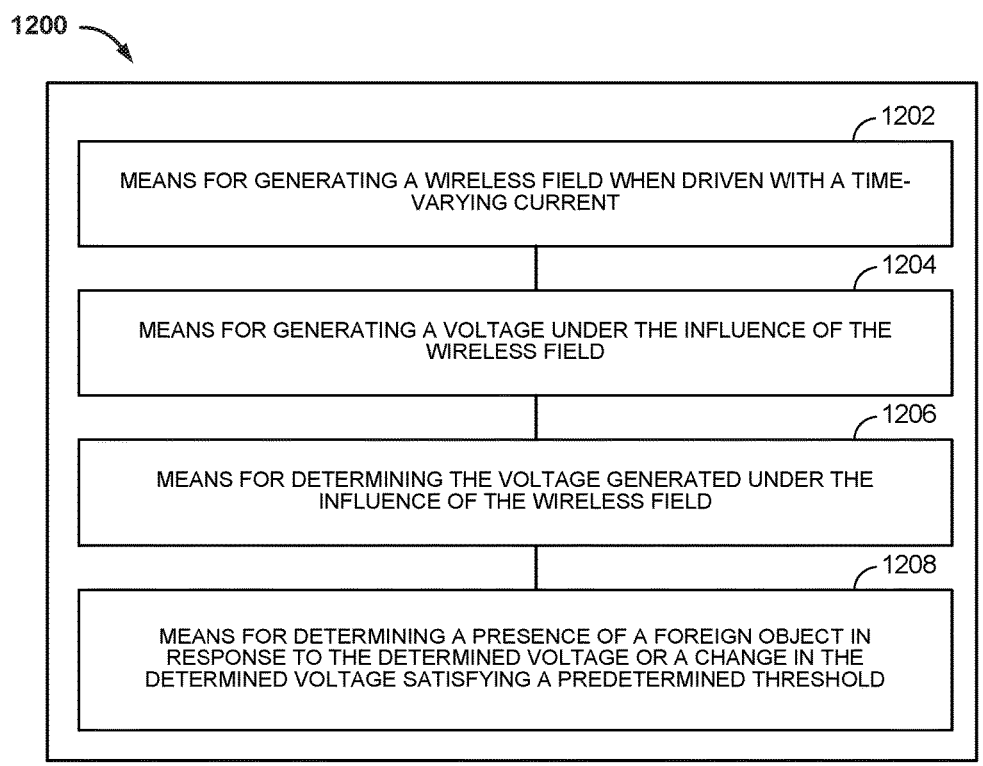
FIG. 12 is another functional block diagram of an apparatus for wireless power transfer, in accordance with some implementations.

FIG. 12 is another functional block diagram of an apparatus 1200 for wireless power transfer, in accordance with some implementations. The apparatus 1200 may be configured to perform one or more operations as previously described in connection with FIG. 11. The apparatus 1200 includes means 1202 for generating a wireless field when driven with a time-varying current. In some implementations, the means 1202 may comprise the coupler 414 of FIG. 4.

The apparatus 1200 further includes means 1204 for generating a voltage under the influence of the wireless field. In some implementations, the means 1204 may be configured to perform the operation of operation block 1104 previously described in connection with FIG. 11. In some implementations, means 1204 may comprise the sense pad(s) 446, 447 of FIG. 4.

The apparatus 1200 further includes means 1206 for determining the voltage generated under the influence of the wireless field. In some implementations, the means 1206 may be configured to perform the operation of operation block 1106 previously described in connection with FIG. 11. In some implementations, means 1206 may comprise the measurement circuit 444, as previously described in connection with FIG. 4.

The apparatus 1200 further includes means 1208 for determining a presence of a foreign object in response to the determined voltage or a change in the determined voltage satisfying a predetermined threshold. In some implementations, the means 1208 may be configured to perform the operation of operation block 1108 previously described in connection with FIG. 11. In some implementations, means 1208 may comprise the controller circuit 440, as previously described in connection with FIG. 4.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for wirelessly transferring charging power, comprising:
   a coupler configured to generate a wireless field for charging a chargeable device in response to being driven with a time-varying current, the wireless field being at a power level that is sufficient to charge the chargeable device;
   a measurement circuit configured to determine a parasitic capacitance between the coupler and ground based on a presence of one or more objects in the wireless field while the coupler generates the wireless field;
   a communication circuit configured to receive a connection request from the chargeable device; and
   a controller circuit configured to:
      determine a presence of a foreign object in response to the determined parasitic capacitance satisfying a detection criteria; and
      determine a presence of the chargeable device for wireless charging in response to determining the presence of the foreign object and receiving the connection request.

2. The apparatus of claim 1, wherein the detection criteria comprises a time-varying pattern of the determined parasitic capacitance predetermined to correspond to a presence of the foreign object.

3. The apparatus of claim 1, wherein the detection criteria comprises a threshold change in the determined parasitic capacitance.

4. The apparatus of claim 1, wherein the controller circuit is configured to adjust the time-varying current driving the coupler in response to determining the presence of the foreign object.

5. The apparatus of claim 1, wherein:
   the measurement circuit is configured to determine the parasitic capacitance at each of a plurality of time instants; and
   the controller circuit is configured to determine the presence of the foreign object in response to a correlation of the determined parasitic capacitance at each of the plurality of time instants satisfying a predetermined relationship.

6. The apparatus of claim 1, wherein the communication circuit is further configured to receive a signal from the chargeable device, the signal indicating the presence of the chargeable device for wireless charging, and wherein the controller circuit is further configured to adjust at least one operating parameter of the coupler in response to the communication circuit receiving the signal from the chargeable device.

7. The apparatus of claim 1, wherein the foreign object comprises a human, another living animal, or a non-metallic object.

8. The apparatus of claim 1, wherein the coupler is further configured to wirelessly transfer the charging power to the chargeable device via a magnetic field component of the wireless field.

9. A method for wirelessly transferring charging power, comprising:
   generating, at a coupler, a wireless field for charging a chargeable device when driven with a time-varying current, the wireless field being at a power level that is sufficient to charge the chargeable device;
   determining a parasitic capacitance between the coupler and ground based on a presence of one or more objects in the wireless field while the coupler generates the wireless field;
   receiving, at a communication circuit, a connection request from the chargeable device;
   determining a presence of a foreign object in response to the determined parasitic capacitance satisfying a detection criteria; and
   determining a presence of the chargeable device for wireless charging in response to determining the presence of the foreign object and receiving the connection request.

10. The method of claim 9, wherein the detection criteria comprises a time-varying pattern of the determined parasitic capacitance predetermined to correspond to a presence of the foreign object.

11. The method of claim 9, wherein the detection criteria comprises a threshold change in the determined parasitic capacitance predetermined to correspond to a presence of the foreign object.

12. The method of claim 9, further comprising adjusting the time-varying current driving the coupler in response to determining the presence of the foreign object.

13. The method of claim 9, further comprising:
   determining the parasitic capacitance at each of a plurality of time instants; and
   determining the presence of the foreign object in response to a correlation of the determined parasitic capacitance at each of the plurality of time instants satisfying a predetermined relationship.

14. The method of claim 9, further comprising:
   receiving a signal from the chargeable device, the signal indicating the presence of the chargeable device for wireless charging; and
   adjusting at least one operating parameter of the coupler in response to receiving the signal from the chargeable device.

15. The method of claim 9, wherein the foreign object comprises a human, another living animal, or a non-metallic object.

16. The method of claim 9, further comprising wirelessly transferring the charging power to the chargeable device via a magnetic field component of the wireless field.

17. An apparatus for wirelessly transferring charging power, comprising:
   means for generating a wireless field for charging a chargeable device when driven with a time-varying current, the wireless field being at a power level that is sufficient to charge the chargeable device;
   means for determining a parasitic capacitance between the means for generating and ground based on a presence of one or more objects in the wireless field while the means for generating generates the wireless field;
   means for receiving a connection request from the chargeable device;

means for determining a presence of a foreign object in response to the determined parasitic capacitance satisfying a detection criteria; and means for determining a presence of the chargeable device for wireless charging in response to determining the presence of the foreign object and receiving the connection request.

18. The apparatus of claim 17, wherein the detection criteria comprises a time-varying pattern of the determined parasitic capacitance predetermined to correspond to a presence of the foreign object.

19. The apparatus of claim 17, wherein the detection criteria comprises a threshold change in the determined parasitic capacitance predetermined to correspond to a presence of the foreign object.

20. The apparatus of claim 17, further comprising means for adjusting the time-varying current driving the means for generating in response to determining the presence of the foreign object.

21. The apparatus of claim 17, further comprising:

means for determining the parasitic capacitance at each of a plurality of time instants; and means for determining the presence of the foreign object in response to a correlation of the determined parasitic capacitance at each of the plurality of time instants satisfying a predetermined relationship.

22. The apparatus of claim 17, further comprising:

means for receiving a signal from the chargeable device, the signal indicating the presence of the chargeable device for wireless charging; and means for adjusting at least one operating parameter of the means for generating in response to receiving the signal from the chargeable device.

23. The apparatus of claim 17, wherein means for generating a wireless field wirelessly transfers the charging power to the chargeable device via a magnetic field component of the wireless field.

* * * * *